Sept. 15, 1964  A. SILOMBRA  3,148,395
METHOD OF MANUFACTURING RUBBER BOOTS
Filed July 10, 1961  4 Sheets-Sheet 1
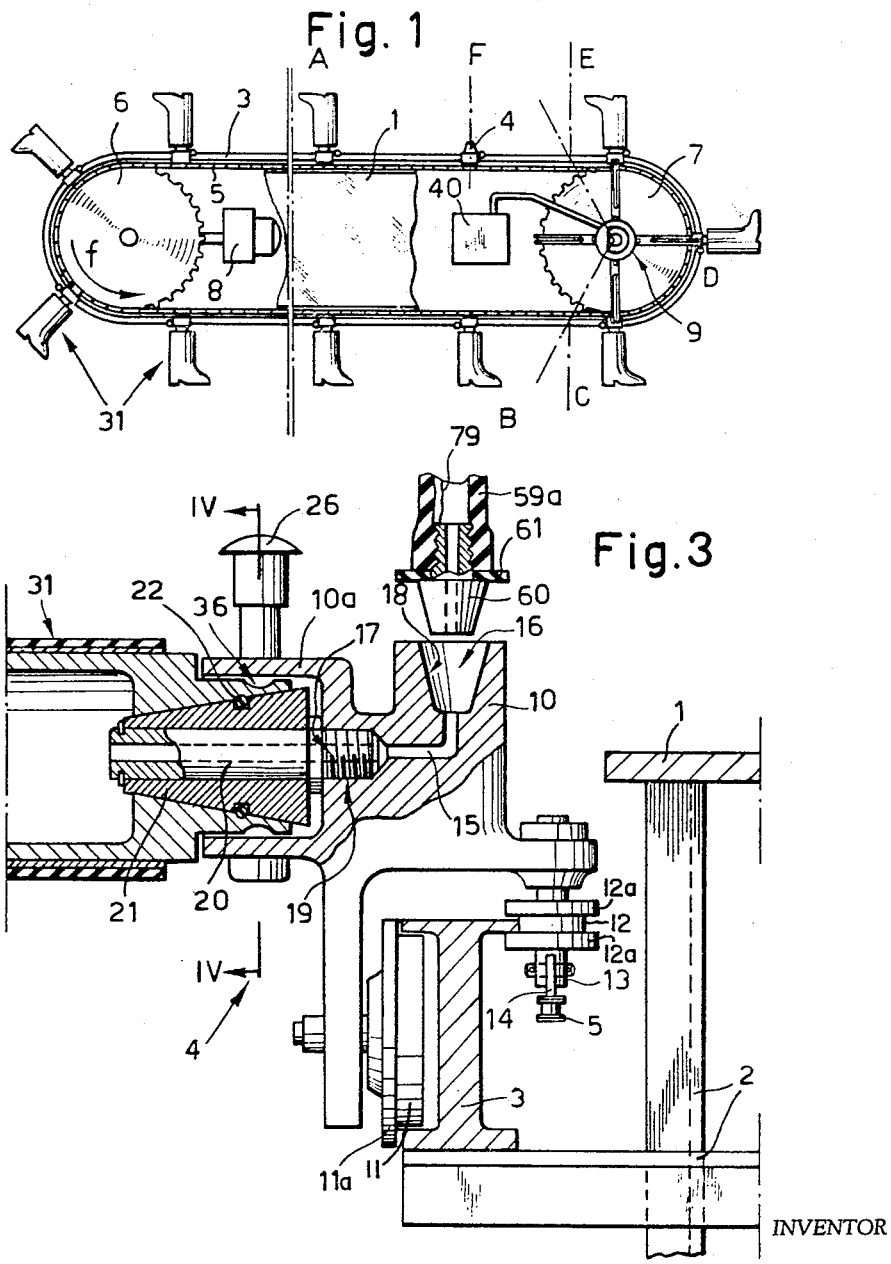
INVENTOR
BY
ATTORNEY

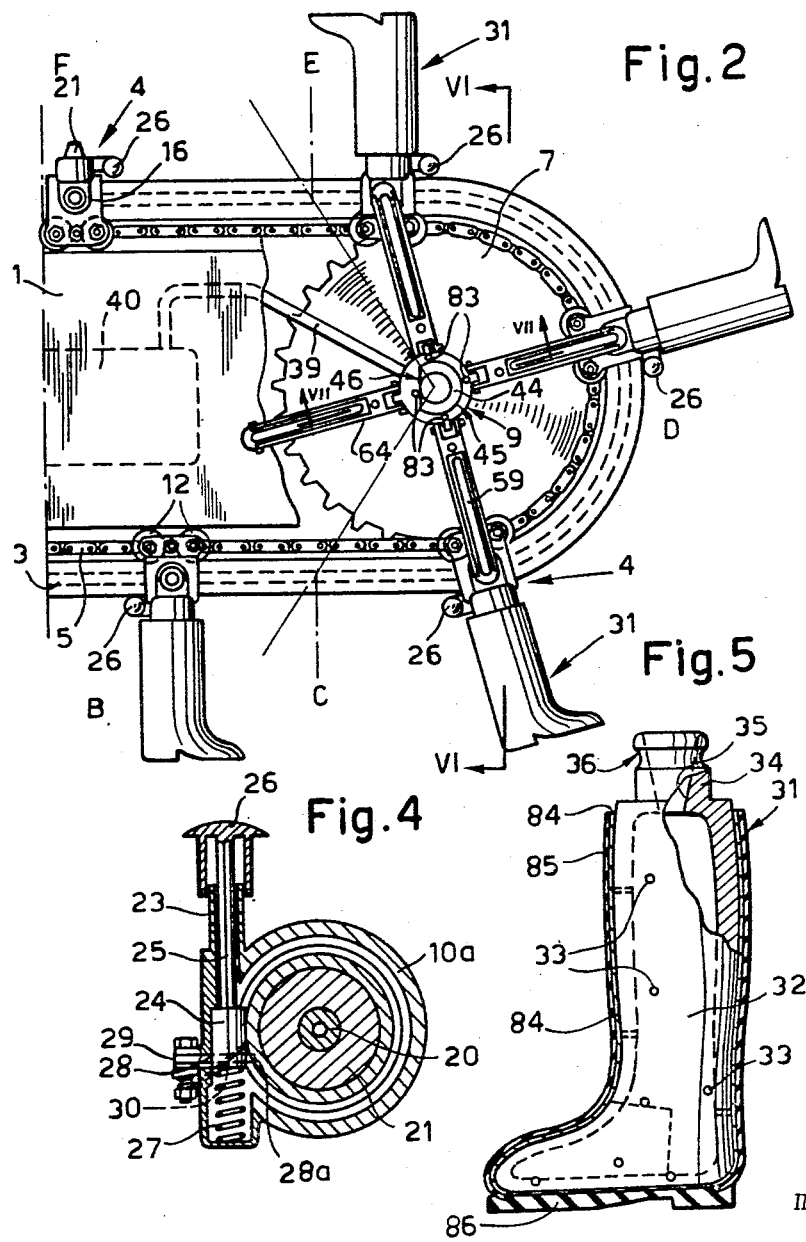

Sept. 15, 1964     A. SILOMBRA     3,148,395
METHOD OF MANUFACTURING RUBBER BOOTS
Filed July 10, 1961     4 Sheets-Sheet 3
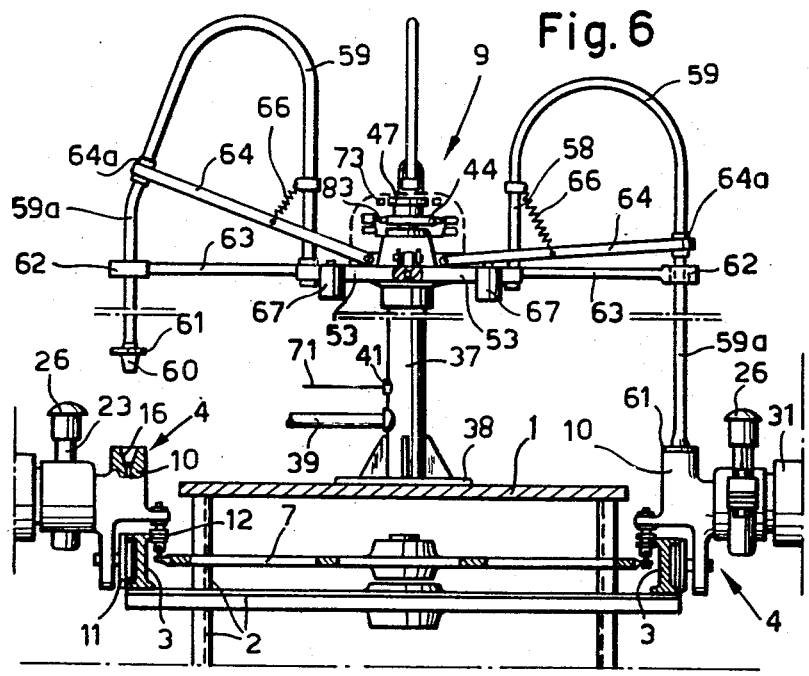
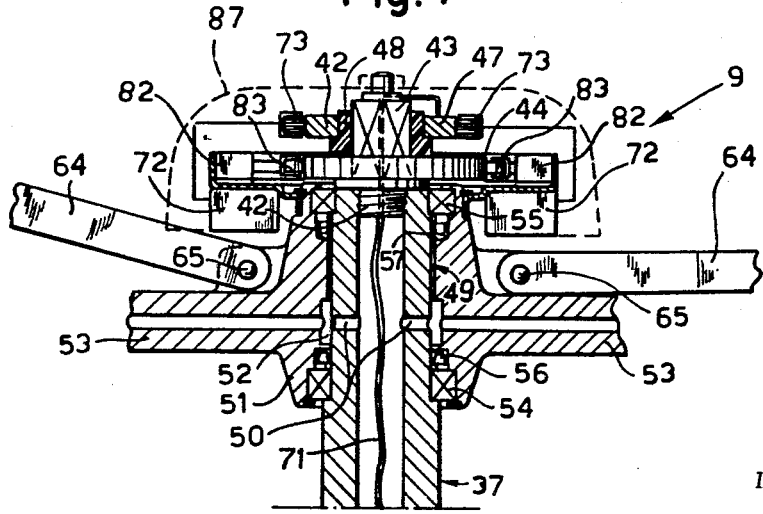
INVENTOR
BY
ATTORNEY Sept. 15, 1964        A. SILOMBRA        3,148,395
METHOD OF MANUFACTURING RUBBER BOOTS
Filed July 10, 1961                                        4 Sheets-Sheet 4
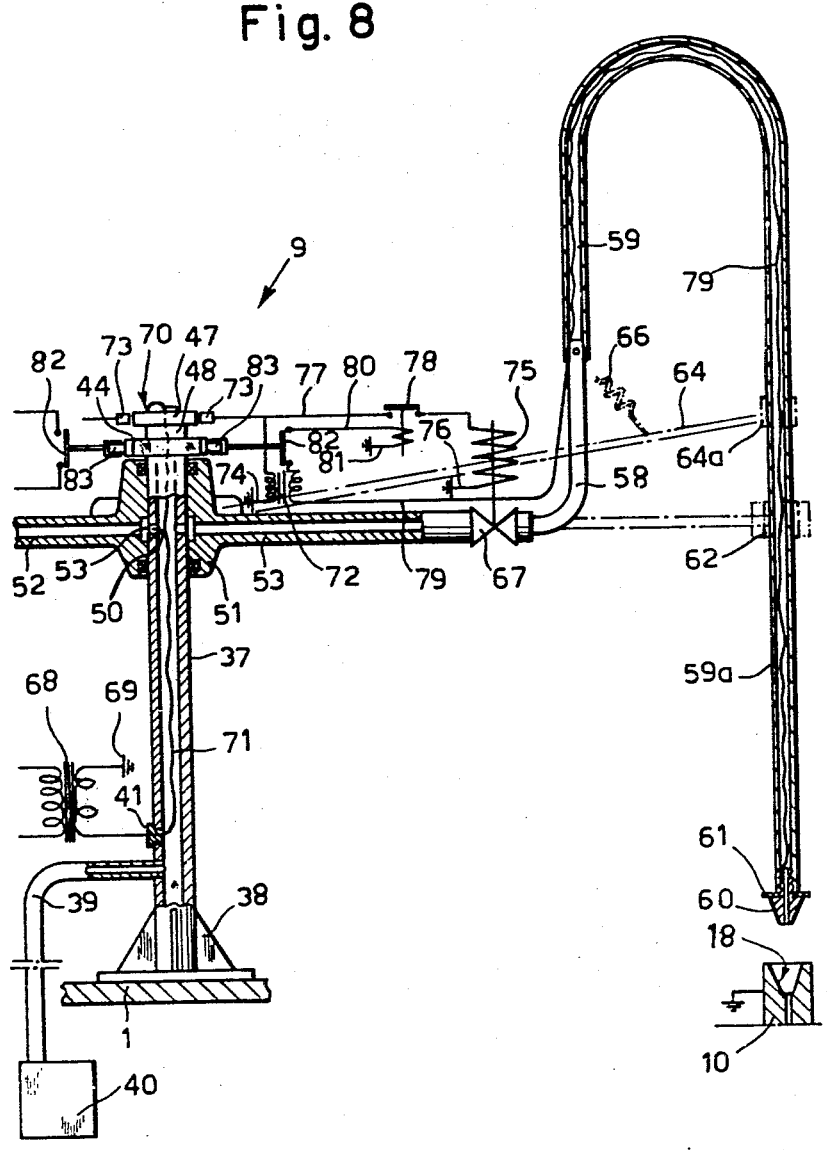
INVENTOR
BY
ATTORNEY United States Patent Office 3,148,395
Patented Sept. 15, 1964

3,148,395
METHOD OF MANUFACTURING RUBBER BOOTS
Armando Silombra, 23 Via Verolengo, Turin, Italy
Filed July 10, 1961, Ser. No. 122,779
Claims priority, application Italy Aug. 12, 1960
3 Claims. (Cl. 12—142)

This invention relates to a method for making rubber boots.

Hitherto, the usual practice consisted in placing the boot components on lasts carried by an endless conveyor from one operator to another for successive lasting of the lining, upper and sole. The lasting step was followed by manual pressing or rolling of said boot components against the last in order to insure satisfactory adherence of the components as well as eliminate, as far as possible, air pockets trapped between the last surface and superimposed boot components. The lasted boots were then taken off the conveyor, placed on suitable racks and put in batches into an autoclave for vulcanizing. As manual pressing was insufficient to eliminate all air pockets, blisters were formed on the boot walls when the temperature in the autoclave was raised, so that each last, which was accordingly made hollow, had to be connected through a suitable piping provided in the racks to a suction pump which sucked air from the last cavities while vulcanizing was in progress.

The main drawback of the method including sucking air from batches of lasted boots already in the autoclave, consists in the large number of lasts connected to the suction piping in the racks, which in turn had to be connected through a conduit extending externally of the autoclave to a pump.

Air leakage from the autoclave through each joint counteracted the action of the suction pump so that a lower suction, if any, was exerted on the lasts connected further down the conduit, resulting in the formation of said blisters, hence faulty product.

An object of this invention is to provide a method of manufacturing rubber boots wherein the operation of manual pressing or rolling of lasted boots is dispensed with and replaced by a uniform compression applied pneumatically by setting up during a predetermined period of time a sub-atmospheric pressure in the last cavity to afford a speedier and cheaper manufacture of a considerably improved product.

Another object of this invention is to obviate the necessity of applying suction to the lasts with boots thereon, after the latter have been introduced into an autoclave for vulcanizing.

The above and other objects of the invention will appear more clearly from the following detailed description when taken in connection with the accompanying drawings, showing by way of example a preferred embodiment.

Referring to the drawings:

FIGURE 1 is a diagrammatic plan view of the conveyor and distributor;

FIGURE 2 is an enlarged plan view of the distributor and return end of the conveyor;

FIGURE 3 is a part-sectional side view of the last supporting jack;

FIGURE 4 is a sectional view on line IV—IV of the FIGURE 3;

FIGURE 5 is a part-sectional side view of the last with an assembled boot thereon;

FIGURE 6 is a sectional view on line VI—VI of FIGURE 2 showing one hose of the distributor in its raised condition;

FIGURE 7 is a sectional view on line VII—VII of FIGURE 2; and

FIGURE 8 is a diagrammatical part-sectional view of the air conduits and electrical connections of the distributor.

An elongated bench 1 is supported by a substructure 2. Suspended peripherically of said bench is an endless conveyor comprising a guide rail 3 of I-section on which a plurality of uniformly spaced last supporting jacks 4 are carried along from one operator to another by means of an endless chain 5 suspended from said jacks. The chain 5 travels around two sprocket wheels 6, 7 situated at the ends of the bench 1. The wheel 6 may be driven at a desired speed by a geared motor 8, wheel 7 being a reversing gear provided with a chain tensioning device, not shown.

Situated internally of the reversing loop of the conveyor is an air suction distributing device 9, having a plurality of radially extending arms arranged at an angular pitch matching the angular pitch of jacks 4 when the latter travel over the reversing wheel 7. By means of this distributing device, a sub-atmosphere pressure is set up in each last at the reversing loop of the conveyor. Each jack 4 comprises a body 10 provided at its lower portion with one vertical roller 11, a pair of horizontal rollers 12, and a fork 13 for fixing the jack to one of the cleats 14 fastened at regular intervals to the chain 5. The vertical roller 11 includes a flange 11a and each horizontal roller 12 has two flanges 12a. These flanges guide their respective rollers 11 and 12 on the guide rail 3. The upper portion of the body 10 is formed with an air passageway 15 leading to an opening 16 in the upper face of the body 10, and an opening 17 in the lateral, outwardly turned face of said body. The portion of the passageway 15 adjacent the opening 16 is flared out to form a conical seat 18. The opposite end portion of the passageway 15 is threaded at 19 to receive the threaded portion of a hollow pin 20 having a conical head 21 mounted in free relationship thereon. The head 21 is provided intermediate the length with an external circumferential groove to accommodate a sealing ring 22.

Supported by a tubular extension 10a on the body 10 and spaced from the conical head 21 is a quick-release last engaging snap lock comprising a spring-loaded axially slidable rod 23, FIG. 4, having a large diameter portion 24 and a small diameter portion 25 ending by a knob 26. The rod 23 is urged by a spring 27 to its extended position and can be depressed by manual action on the knob 26.

Intermediate the length of the rod 23 a catch plate 28 is pivoted at 29 in a slot in the body extension 10a. A tip 28a of the catch plate protrudes past the rod 23 towards the conical head 21. A spring 30 urges the catch plate 28 against the rod, so that the plate locks the rod when the latter is depressed and releases the rod when the tip 28a is pressed against the action of the spring 30.

A last 31, FIG. 5, adapted to be detachably connected to the jack 4 comprises a hollow boot-shaped portion 32 formed by a wall having perforations 33. The boot-shaped portion 32 is formed at its end opposite the sole end with a longitudinal cylindrical boss 34 having a concentrical conical cavity 35 communicating with the cavity in the last and complementary to the conical head 21. Intermediately its length, the boss 34 is formed with an external circumferential groove 36 which, when the last 31 is connected to the jack 4, registers with the large diameter portion 24 on the rod 23, to thereby lock the last on the jack and at the same time allow free rotation around the pin 20 of the last supported by the conical head 21. When the last is connected to the jack, the sealing ring 22 forced into its groove by the wall of the conical cavity 15 improves air tightness of the joint.

In order to disconnect the last 31 from the jack 4, the knob 26 is manually depressed until the large diameter portion 24 disengages the groove 26, the catch plate 28 locks said large diameter portion 25 of the rod 23. To connect a further last to the jack all that need be done is to fit the cylindrical boss 34 on said last on the conical head 21 so that the boss end presses the tip 28a on the catch plate 28 causing release of the rod 23, which is urged upwardly by the spring 30 and engages the groove 36.

The air suction distributing device 9 is mounted on a vertical stationary support, comprising a tube 37, FIG. 8, having its bottom end sealed and formed with a suitable base 38 for attachment to the table 1. At its base end the tube 37 is connected by means of a tube 39 to a suction conduit on a pump 40. At its base end the tube 37 is moreover formed with a lateral opening closed by a bored plug 41. The top end of the tube 37 is sealed by means of a bored plug 42 provided externally with a prismatic projection 43, FIG. 7.

Fixed on the projection 43 is a stationary cam 44 having a circular profile 45 extending through over half the circumference and a rectilinear closing profile 46. The cam is oriented with its circular profile facing the reversing loop of the conveyor. Above the cam 44 a circular electric current distributor 47 is fixed to the projection 43 by means of an insulating bushing 48. The top end portion of the tube 37 forms a spindle 49 provided intermediate its length with radially arranged holes 50.

A hub 51 formed internally with a cavity 52 and having four radially extending tubular arms 53 communicating with the cavity 52 is mounted on the spindle 49 by means of ball bearings 54, 55, so that the cavity 52 is aligned with the holes 50. The hub 51 is sealed against the spindle 49 by two sealing rings 56, 57 sealing the cavity 52 from the atmosphere.

Each arm 53 is provided with a lifting tube 58 connected to a downwardly looping flexible hose 59 having a downwardly extending branch 59a extending through a guide ring 62 fixed to an extension 63 on the arm 53, FIG. 6. The branch 59a is provided at its free end with a metallic nozzle 60 of a conical shape complementary to the conical seat 18 in the jack 4. The nozzle 60 is provided at its large end with a radially extending flexible disc washer 61, FIG. 8.

The weight of the nozzle 60 and the portion of the hose 59 is supported by an oscillating arm 64 pivoted at 65 to the hub 51 and provided with a clamp 64a for clamping the hose 59. The arm 64 is held in its raised position by the action of a spring 66.

The nozzle 60 can be lowered manually by pulling down the hose branch 59a against the action of the spring 66. When the nozzle 60 is lowered it can be inserted into the seat 18.

The air flow through each hose 59 is governed by a solenoid controlled cut-off valve 67 arranged on each arm 53, FIG. 8. The valve 67 is jointly operated by a switch controlled by the cam 44 and by the insertion of the nozzle 60 into the seat 18.

For this purpose the distributor is provided with an electric control system comprising a step-down transformer 68 having its primary winding connected to a power supply (not shown). One end of the secondary winding is grounded at 69, its other end connected at 70 to the current distributor 47 by means of a lead 71 extending through the tube 37 and in an air-tight manner through the bore in both plugs 41 and 42, FIG. 8.

Supported by the hub 51 are four step-down transformers 72, the primary windings of which are connected in parallel to the secondary windings on the transformer 68 by means of brushes 73 contacting the distributor 47 and by a ground connection 74.

A solenoid 75 on each valve 67 is grounded at 76 and is connected to the primary winding of its respective transformer 72 by means of a lead 77 controlled by a relay 78 energized by the secondary winding of the transformer 72. One end of the secondary winding of the transformer 72 is connected to the nozzle 60 by means of a flexible lead 79 extending through the hose 59, the other end of said secondary winding being connected by a lead 80 to the coil of relay 78 grounded at 81. The lead 80 has series connected therein a circuit cut-out switch 82 operated by cam 44 through a follower 83 supported from the hub 51.

The relay 78 can be energized to close the circuit of the solenoid 75 only when its respective follower 83 contacts the circular profile 45 on the cam 44, thereby closing the cut-out switch 82, the circuit is completed when a respective nozzle 60 is grounded by insertion into a body 10. Such a condition occurs only on such arms on the distributor 9 as are located in the sweep of the angle CDE, FIG. 2, determined by the imaginary radii of the cam 44 extending through the end points on the circular profile 45 and intersecting the center line of the guide rail 3 at points C and D, respecitvely. A suitable hood 87, FIG. 7, may be fixed to the extension 43 for protection of the electrical installation mounted on the hub 51.

The operation of the above-described apparatus is as follows. Assuming the endless conveyor travels in the direction of the arrow "f," FIG. 1, an operator situated at point A inserts a last on the jack 4 and pulls on a sewn-up lining 84, FIG. 5. Further operators spaced round the conveyor between points A and B fasten by gluing onto the lining an upper 85 and a sole 86 in a sequence of operations taking advantage of the rotational mounting of the last on the jack. The operator at point B knurls the seams of the boots and inserts the nozzle 60 into the seat 18 of the passageway 15, after the jack 4 passes over the point C on the conveyor. Insertion of the nozzle effects opening of the valve 67 and establishes interconnection of the pump 40 and last, whereby the pump 40 sucks air from the last cavity. This causes the atmospheric pressure to compress the boot aagainst the last and the washer 61 against the jack face around the opening 16, sealing the joint and providing a force which prevents the spring 66 from raising the arm 64 and disconnecting the nozzle 60 from seat 18. Traveling around the reversal loop of the conveyor the jack 4 pulls the hose 59a thereby rotating the distributor 9. The last is subjected to suction during a predetermined period of time necessary for the air trapped between the boot and last to seep through the lining 84 and perforations 33 into the last cavity.

When the jack reaches point E the cam operated cut-out opens the circuit causing the valve 67 to close. Atmospheric air leaks through imperfect joints into the last cavity, equalizes the pressure and counterbalances the atmospheric pressure on the washer 61, causing the spring 66 to raise the arm 64 and hose 59a, thereby disconnecting the nozzle 60 from the seat 18.

The distributor is now rotated by a further jack on the conveyor, the disconnected hose proceeding towards the point C ready for connection to an incoming jack. After passing the point E the jack passes an operator at F who inspects the boot, depresses the knob 26, pulls the lasts off the jacks and places them on racks for delivery in batches to an autoclave for vulcanizing.

While a preferred embodiment of the invention has been described and illustrated, it will be understood that modifications of constructional details and arrangement of parts may suggest themselves to those skilled in the art, and it is therefore not the purpose to limit the invention otherwise than necessitated by the scope of the appended claims.

What I claim is:

1. In the method of manufacturing rubber boots by vulcanizing, a first step of assembly in series of successive operations the boot components such as lining, upper and sole on a plurality of hollow perforated lasts, a second step of setting up during a predetermined period of time a subatmospheric pressure in each last separately following the completion of operations of the first step on said last, and a third step of grouping the lasted boots for delivering in batches to an autoclave for vulcanizing.

2. In the method of manufacturing rubber boots by vulcanizing including assembling in a series of successive operations the boot components such as lining, upper and sole on a plurality of hollow perforated lasts while said lasts are moved over a portion of a predetermined path from one operator to another and over a successive portion of said path for setting up during a predetermined period of time a sub-atmospheric pressure in each last separately, removing said lasts from said path and grouping said lasts for delivery in batches to an autoclave for vulacnizing.

3. In the method of manufacturing rubber boots by vulcanizing, providing an endless conveyor, assembling the boot components such as lining, upper and sole on a plurality of hollow perforated lasts carried by said conveyor from one operator to another, providing an air suction distributing device on said conveyor and connecting during a predetermined period of time said distributing device to the cavities of the moving lasts, thereby causing compression by atmospheric pressure of said boot components against the last, and disconnecting and removing the lasts with compressed boots thereon from the conveyor and grouping said lasts for delivery in batches to an autoclave for vulcanizing.

References Cited in the file of this patent
UNITED STATES PATENTS

| | | |
|---|---|---|
| 1,283,144 | Gammeter | Oct. 29, 1918 |
| 1,925,899 | Glidden et al. | Sept. 5, 1933 |
| 2,076,736 | Lewis | Apr. 13, 1937 |
| 2,097,799 | Perry et al. | Nov. 2, 1937 |
| 2,114,486 | Gialdini | Apr. 19, 1938 |
| 2,390,935 | Griffin et al. | Dec. 11, 1945 |
| 2,460,782 | Gialdini | Feb. 1, 1949 |
| 2,512,574 | Carson | June 20, 1950 |
| 2,651,062 | Smiley | Sept. 8, 1953 |